C. SUTTIE.
APPARATUS FOR EMPLOYMENT IN TREATING FLAX AND THE LIKE FIBERS.
APPLICATION FILED JUNE 3, 1914.

1,191,245.

Patented July 18, 1916
2 SHEETS—SHEET 1.

Witnesses:

C. Suttie
Inventor.
By Broydon Marks
Attorney.

C. SUTTIE.
APPARATUS FOR EMPLOYMENT IN TREATING FLAX AND THE LIKE FIBERS.
APPLICATION FILED JUNE 3, 1914.

1,191,245.   Patented July 18, 1916.
2 SHEETS—SHEET 2.

Witnesses:
Charles B Crompton
May G Luttrell

C. Suttie
Inventor
By E Croydon Marks
Attorney

UNITED STATES PATENT OFFICE.

CHARLES SUTTIE, OF AUCKLAND, NEW ZEALAND.

APPARATUS FOR EMPLOYMENT IN TREATING FLAX AND THE LIKE FIBERS.

1,191,245.

Specification of Letters Patent.

Patented July 18, 1916.

Application filed June 3, 1914. Serial No. 842,802.

*To all whom it may concern:*

Be it known that I, CHARLES SUTTIE, a citizen of the Dominion of New Zealand, and residing at Auckland, in the Provincial District of Auckland, in the Dominion of New Zealand, have invented certain new and useful Improvements in Apparatus for Employment in Treating Flax and the like Fibers, of which the following is a specification.

The invention relates to the treatment of phormium tenax fiber, and fiber bearing leaves, stalks and the like, and provides means whereby said material is held and conveyed, and particularly while being treated by a dressing machine or a series of machines for carrying out different steps in the treatment, and whereby such material can be turned and a change of hold effected thereon.

The invention comprises a supported continuous traveling conveyer of the belt type passing around horizontal pulleys and carrying a plurality of brackets with holders thereto, each holder being adapted to turn in its bracket and having a holding member on which the material is placed and a gripping member designed to grip the material against the holding member, the gripping member being designed to rise and fall where required, guides for raising and keeping raised the gripping member when it is desired to open and keep open the holder in order to permit the material to be placed in, drawn through, or removed from the holder, guides for lowering and keeping lowered the gripping member when it is desired to hold the material firmly in the holder for conveyance or operation by the dressing machine a member on the holder adapted to engage fixed members so as to turn the holder when desired to permit different faces or portions of the material to be treated in succession by a dressing machine, a guide to keep the holders from turning except where desired, and a detaining device for engaging and gripping one part of the material when the holder opens and releases its hold on the material and for releasing the material when the holder has passed on and renewed its grip at another portion in the length of the material.

The invention is illustrated in the accompanying drawings in which:—

Figures 1, 2, 3:
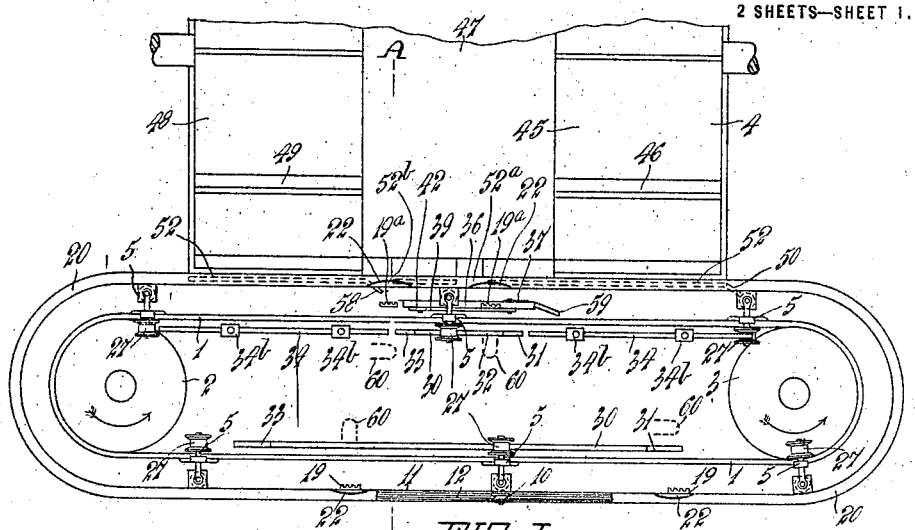
Figure 4:
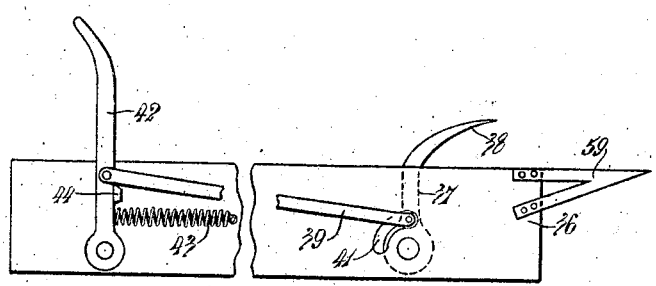
Figures 5, 6:
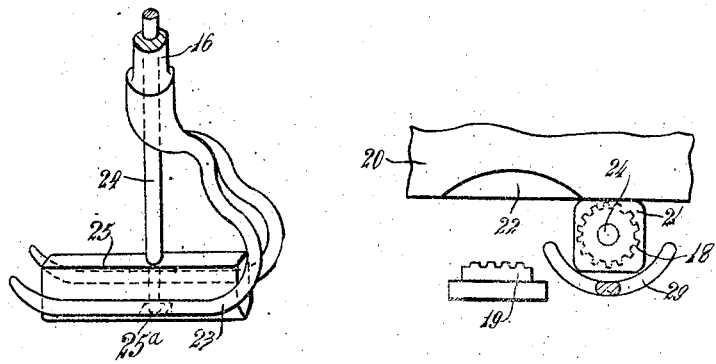
Figure 7:
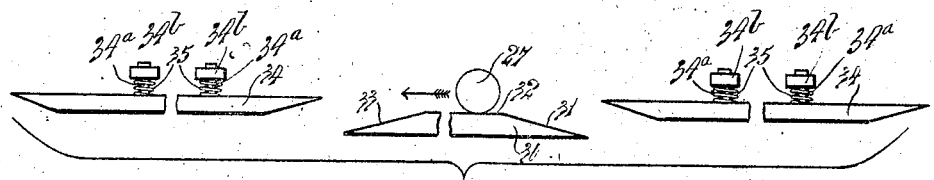

Figure 1, is a diagrammatic plan of the apparatus, Fig. 2, is a cross sectional elevation on a larger scale on line A—A, Fig. 1, Fig. 3, is an elevation of a guide, Fig. 4, a side elevation of change grip apparatus, Fig. 5, a perspective elevation of a hook, Fig. 6, a plan of turning apparatus, Fig. 7, a side elevation of guide rails.

An endless conveyer belt 1, passes around horizontal rollers 2 and 3 and in front of the dressing machine 4, and is provided with a plurality of holders 5. Each holder comprises a bracket 6 attached to the belt 1 by bolts 7. The bracket has an upper horizontal arm 8 terminating in a spindle 9 whereon a grooved pulley 10 is mounted. A board frame or support 11 surrounds the belt 1 and has a rail 12 whereon the pulley 10 runs and supports the bracket 6 and its attachments. A lower arm 13 of the bracket is formed with a toe 14, which is slidable between the board 11 and a rabbeted bar 15 fixed to, and continuous around the inside of the said board.

A sleeve 16 journaled in the bracket 6 is supported by a collar 17 which is fixed to the said sleeve and rests upon the top of the bracket, and above the said collar a pinion 18, fixed to the sleeve, is adapted to gear with racks 19 fixed at required positions to a support 20 and with other racks $19^a$ fixed to a support $20^a$, which is carried upon standards $20^b$. The support 20 is continuous, is located above and corresponds in shape to the board 11, and is carried by standards $20^c$. A striker arm is a suitable substitute for the pinion 18, and studs for the racks 19. A block 21 fixed to the sleeve 16 is sided and slides along the face of the support 20, which has recesses 22 wherein the block may turn, when the pinion 18 is operated by any of the racks 19 and $19^a$. The block prevents the pinion 18 from turning except when required, and holds the said pinion in correct position, so that its teeth shall always engage accurately with the racks 19 and $19^a$. The proportion between the number of teeth in each rack and the number of teeth in the pinion is arranged so as to give the necessary quarter or half turn as may be required to the pinion when passing and operated by a rack.

The lower end of the sleeve 16 is provided with, and forms the stem of, a double or bifurcated hook 23 for holding the material.

A spindle or rod 24, slidable vertically in the sleeve 16, has a foot or wedge 25 mounted upon a pivot $25^a$ integral with the end of the spindle and the said block is slidable between the bifurcations of the hook 23, which are extended up the heel of the hook and form a guide for the wedge. The wedge is turnable on the pivot 25ª and turns with the hook 23. An arm 26, fixed to the spindle 24 is slidable vertically in a forked guide 28 of a standard 29 integral with the bracket 6. A friction wheel 27 is mounted freely on a pivot 27ª integral with the arm 26. The weight of the spindle 24 and its associated parts tend to force the wedge 25 to the bottom of the hook 23. The standard 29 is cranked as shown in Fig. 6 around the block 21 to permit the pinion 18 to pass to the racks 19ª. A guide rail 30 having a sloping face 31, up which wheel 27 runs and a level face 32 on which the wheel runs, is provided wherever required upon the support 20ª, to raise and keep raised the wedge 25; and the said guide rail is provided with another sloping face 33 down which the wheel 27 runs whenever it is desired to force the wedge 25 to the bottom of the hook 23. Guides 34 suspended by bolts 34ª from supports 34ᵇ fixed to extensions of the standards 20ᵇ prevent the wheel 27, and thereby the wedge block 25, from rising while the material is being treated, and springs 35 between the guides 34 and the supports 34ᵇ allow the said guide to yield to varying sizes of loads placed on the hook 23.

A bar 36 fixed at a lower level than the hook 23 has a pivoted arm 37 terminating in a prong 38, which normally projects above the line of the top of the bar 36, the prong being arranged so that it passes between the bifurcations of the hook 23 in its travel. A rod 39, upon the other side of the bar is pivoted to the arm 37 by a stud 37ª which passes through a curved slot 41 in the bar 36. The other end of the rod 39 is pivoted to a lever 42. A spring 43 keeps the lever 42 in its normal position against a stop 44.

The dressing machine 4 has a concave 52 and a single drum divided into sections, and the first section 45 is furnished with scrapers or beaters 46, a section 47 is not provided with scrapers and is quite plain, a third section 48 has scrapers or beaters 49. One portion of the material is directed into the dressing machine by a guide 50 consisting of a pointed bar or bracket, fixed to the concave 52 and projecting at an angle therefrom into the path of the holders. The material is treated while passing across section 45, the grip of the wedge 25 and the hook 23 upon the material is changed while the material is passing across section 47, where friction on the material is much lessened and the change of grip can be made without excessive drag. The other portion of material is treated while passing across section 48. After the holder passes section 45 a guide 59, similar in construction to the guide 50, directs the outer portion of the material so that it engages the prong 38, and another similar guide 58 directs the untreated part of the material to section 48 of the machine. The concave 52 is removed from the front of section 47, or slots 52ª and 52ᵇ may be provided through the concave opposite such section to allow the material to pass respectively from and to the drum.

In operation the material to be treated is placed upon the hooks 23 at a spot remote from the dressing machine, where the wheel 27 is riding on the face 32 of the guide rail 30. As each holder passes on, its wheel 27 runs down the incline 33 thereby allowing the wedge 25 to grip the material between the prongs of the hook 23, the wedge being kept in position by the weight of the spindle 24 and its associated parts and by the pressure on the wheel 27 of the guide rail 34 under the action of the springs 35. Thus the material is held firmly and so that it does not slip from or through the holder while being treated by the sections 45 and 48 of the dressing machine drum. The hook 23 is carried along by the belt 1 and the material or that portion of the same hanging from the side of the hook nearest the drum is guided into and treated by section 45 of the dressing machine drum and after passing such section 45 the wheel 27 arrives at another guide rail 30, up which it travels raising the wedge 25 and thereby loosening the grip upon the material. Simultaneously that portion of the untreated material hanging from the side of the hook 23 remote from the drum is directed by the guide 59 to the prong 38 by which it is held against the side of the bar 36.

The hook 23 continuing its travel across the dressing machine and the untreated portion of the material being held by the prong 38, the treated portion of the material slips through the hook, and at the required time, when a sufficient length of the treated material has slipped, the pinion 18 is engaged by a rack 19ª and the hook 23 is turned and its heel comes into contact with and pushes forward the lever 42 thereby causing the prong 38 to pass forward and below the level of the top of the bar 36 and so become disengaged from the material. Simultaneously the wheel 27 descending the face 33 of the guide rail 30 causes the wedge 25 to descend and grip the material on the hook 23 at a fresh position in the length of the treated material. The portion of the material which was remote from the drum while passing the section 45, and that portion which was originally held by the hook and could not therefore be treated, is directed by guide 58 to section 48 of the dressing machine. After passing section 48 the wheel 27 arrives at another guide rail 30 up the sloping face 31 of which it travels, thereby opening the holder for the purpose of enabling the material to be removed. Continuing its travel the holder is turned again so as to be open and ready to be loaded once more.

The turning of the hook 23 is effected where required by the pinion 18 being engaged by a rack 19 or 19ª, the angles of the block 21 passing into a recess 22 allow the block to make the necessary turn. The angle to which the hook is turned by the different racks is indicated by horse-shoe shaped dotted lines 60.

I do not confine myself to the precise arrangement of apparatus described above as such arrangements may be varied in many ways without departing from the spirit of the invention.

What I do claim and desire to secure by Letters Patent of the United States is:—

1. In apparatus for the treatment of fiber-bearing material, a horizontally arranged endless conveyer, a dressing drum located adjacent one stretch of said conveyer, and having two operating sections spaced apart, a holder for holding the material during its movement past both of said sections and attached to said conveyer, and means for turning the holder as it passes from one of said sections to the other.

2. In apparatus for the treatment of fiber-bearing material, a horizontally arranged endless conveyer, a dressing drum located adjacent one stretch of said conveyer, and having two operating sections spaced apart, a holder for holding the material during its movement past both of said sections and attached to said conveyer, means for turning the holder, and means for opening and closing the holder.

3. In apparatus for the treatment of fiber-bearing material, a horizontally arranged endless conveyer, a dressing drum located adjacent one stretch of said conveyer, and having two operating sections spaced apart, a holder for holding the material during its movement past both of said sections and attached to said conveyer, means for turning the holder, means for opening and closing the holder, and means for changing the position of the grip of the holder on the material.

4. In apparatus for the treatment of fiber-bearing material, a horizontally arranged endless conveyer, a dressing drum located adjacent one stretch of said conveyer, a vertically disposed holder for the material having a hook at its lower end, means for gripping the material in the hook, and means for rotating the holder at desired intervals.

5. In apparatus for the treatment of fiber-bearing material, a horizontally arranged endless conveyer, a dressing drum located adjacent one stretch of said conveyer, a vertically disposed holder for the material having a hook at its lower end, means for gripping the material in the hook, means for rotating the holder at desired intervals, a non-circular block on said holder, and a surface coöperating with said block to prevent rotation of the holder excepting at the desired intervals.

6. In apparatus for the treatment of fiber-bearing material, a horizontally arranged endless conveyer, a dressing drum located adjacent one stretch of said conveyer, a vertically disposed holder for the material comprising a sleeve member having a hook at its lower end, a spindle slidable in said sleeve member and having a wedge member at its lower end, and means for pressing the spindle downwardly.

7. In apparatus for the treatment of fiber-bearing material, a horizontally arranged endless conveyer, a dressing drum located adjacent one stretch of said conveyer, a vertically disposed holder for the material comprising a sleeve member having a hook at its lower end, a spindle slidable in said sleeve member and having a wedge member at its lower end, means for pressing the spindle downwardly, and means for raising said wedge member comprising a wheel mounted on the spindle and guide rails with sloping faces adapted to engage said wheel.

8. In apparatus of the kind described, a holder comprising a holding member on which material of the kind specified is placed, a gripping member designed to grip the material against the holding member and to rise and fall when required, guide rails for raising and lowering the gripping member and other guide rails for holding the holder and gripping members together and apart, means for traveling the holder, a detaining device for engaging and gripping one part of the material when the holder releases its hold on the material, and for releasing the material when the holder has passed on and renewed its grip at another position in the length of the material.

9. In apparatus of the kind described, an endless traveling belt, a plurality of brackets fixed thereto, holders for holding material of the kind specified and adapted to turn in the brackets, fixed members against which members of the holders will engage, a guide to keep the holders from turning except when desired, a movable gripper on the holder, a member connected to the movable gripper, fixed guide rails in the travel of the member to raise or lower or to keep raised or keep lowered such member and movable gripper where required, and a detainer which grips or draws such material through each holder when open and releases such material when gripped by a holder in a fresh position.

10. In apparatus of the kind described, a holder for holding material of the kind specified and comprising a sleeve provided with a gripping hook, a bracket having upper and lower members in which the sleeve is journaled, means for traveling the holder, a pulley freely mounted on said upper member, a rail on which the pulley runs, a toe upon the lower member, and a support carrying a bar having a rabbet in which the toe slides.

11. In apparatus of the kind described, a traveling holder for holding material of the kind specified and comprising a sleeve provided with a bifurcated hook, a rod slidable in the sleeve and furnished with a wedge fitting between the sides of the hook, a wheel mounted upon an arm fixed to the rod, guide rails for the wheel, and means for turning the holder.

12. In apparatus of the kind described, a holder for holding material of the kind specified and comprising a sleeve provided with a holding member, a bracket having upper and lower members in which the sleeve is journaled, a rod slidable in the sleeve and furnished with a gripping member to grip against the holding member, a pulley freely mounted upon the said upper member, a fixed support on which the pulley runs, a toe upon the lower member, and a fixed rabbeted bar coöperating therewith.

13. In apparatus of the kind described having a traveling holder adapted to grip the material being treated, a prong pivoted upon a stationary part of the apparatus and adapted to engage said material when it comes opposite thereto, and a spring operated lever connected to said prong and operated by said holder to release the prong from the material after the latter has been displaced relatively to the holder.

In testimony whereof I have signed my name to this specification in the presence of two witnesses.

CHARLES SUTTIE.

Witnesses:
   MONTAGUE HARRISON WYMYARD,
   ETHEL FRANCES COURTNEY.